United States Patent [19]
Belrose et al.

[11] 4,249,175
[45] Feb. 3, 1981

[54] ELECTRONIC SYMBOLOGY GENERATION FOR RADAR PLAN POSITION INDICATOR (PPI) DISPLAYS USING ROTATING COILS

[75] Inventors: Floyd M. Belrose; Augustus H. Green, Jr., both of Huntsville, Ala.

[73] Assignee: The United States of America as represented by the Secretary of the Army, Washington, D.C.

[21] Appl. No.: 71,976

[22] Filed: Sep. 4, 1979

[51] Int. Cl.³ .............................................. G01S 7/22
[52] U.S. Cl. ................................ 343/5 EM; 315/377
[58] Field of Search ...................... 343/5 EM; 315/377

[56] References Cited
U.S. PATENT DOCUMENTS

| | | | |
|---|---|---|---|
| 2,849,707 | 8/1958 | White | 343/5 EM |
| 3,123,824 | 3/1964 | Sheretz | 343/5 EM X |
| 3,717,873 | 2/1973 | Riggs | 343/5 EM |
| 3,863,098 | 1/1975 | Mehr | 315/377 X |

OTHER PUBLICATIONS

"Target-Plus-Symbol Display Simplifies ATC Radar Tracking", Aerospace Electronics, Dec., 1959, vol. 32, pp. 141-150.

*Primary Examiner*—Malcolm F. Hubler
*Attorney, Agent, or Firm*—Nathan Edelberg; Robert P. Gibson; Robert C. Sims

[57] ABSTRACT

This invention enables the generation of electronic symbology for display on the face of cathode ray tubes employing rotating coils. Offset centering and sweep disabling are employed to permit symbology display for representing target location in range and bearing with respect to other locations on the display.

4 Claims, 7 Drawing Figures

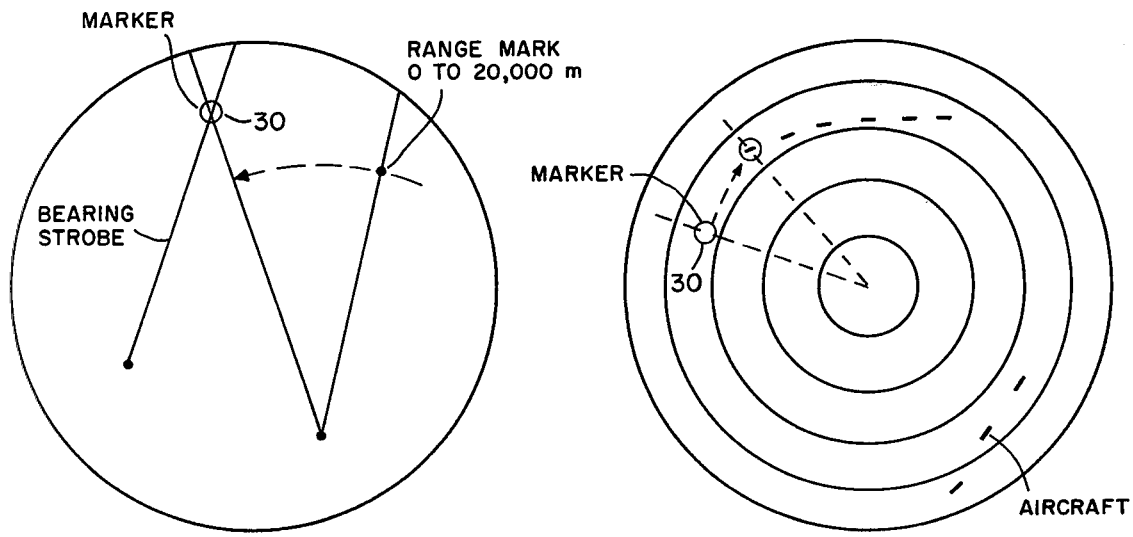
FIG. 1
FIG. 2
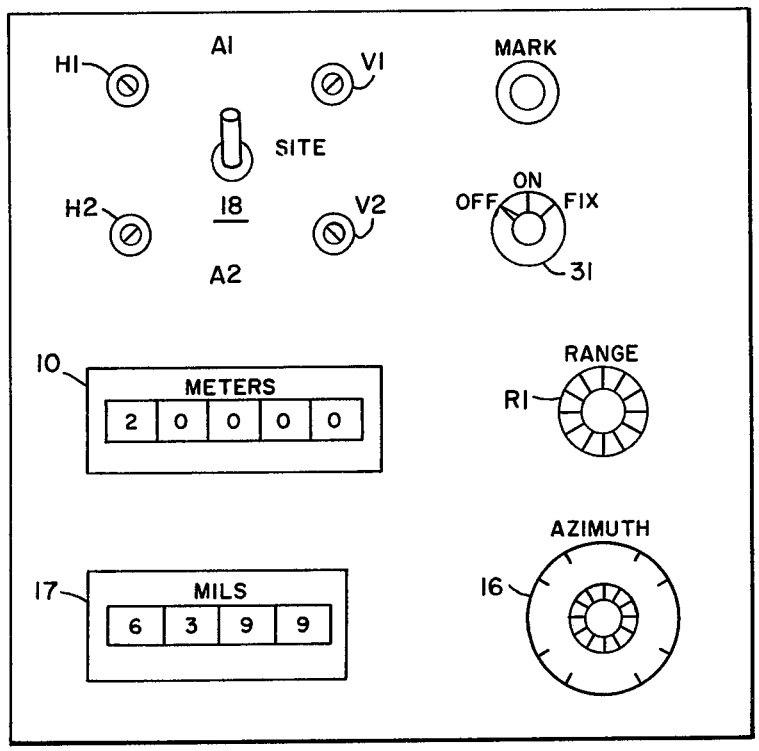
FIG. 3

ELECTRONIC SYMBOLOGY GENERATION FOR RADAR PLAN POSITION INDICATOR (PPI) DISPLAYS USING ROTATING COILS

DEDICATORY CLAUSE

The invention described herein may be manufactured, used, and licensed by or for the Government for governmental purposes without the payment to us of any royalties thereon.

BRIEF DESCRIPTION OF THE DRAWINGS

FIGS. 1 and 2 illustrate typical PPI displays in accordance with the present invention;

FIG. 3 illustrates the marker control panel of the present invention;

DESCRIPTION OF THE PREFERRED EMBODIMENT

Electronic symbology has been used in radar displays for many years to designate targets, friend or foe. This symbology includes generation of cursors, range rings, and target makers. This invention differs from others in that offset centering and sweep disabling is employed with target marking and readouts to permit relative target location in azimuth and range with respect to any display center and to permit aircraft vectoring by a radar operator.

This invention is particularly applicable to planned position indicator PPI radar displays which employ rotating coils to display information on the radar's cathode ray tube display. Its advantage is that it enables electronic symbology to be generated for displaying target location and aircraft vectoring which has heretofore not been possible using rotating coils. This method of electronic symbology generation can be used with other radar displays using similar techniques.

The purpose of the indicator modification is to provide a capability to a radar operator to quickly and accurately obtain target locational data in the form of bearing and range and in turn to relate this information to friendly positions. This requirement is satisfied by displaying symbology and target position readouts to the radar operator (FIGS. 1, 2 and 3). Electronically generated symbology consists of the following:

1. A target identification marker
2. A bearing strobe
3. A range marker

Figure 4:
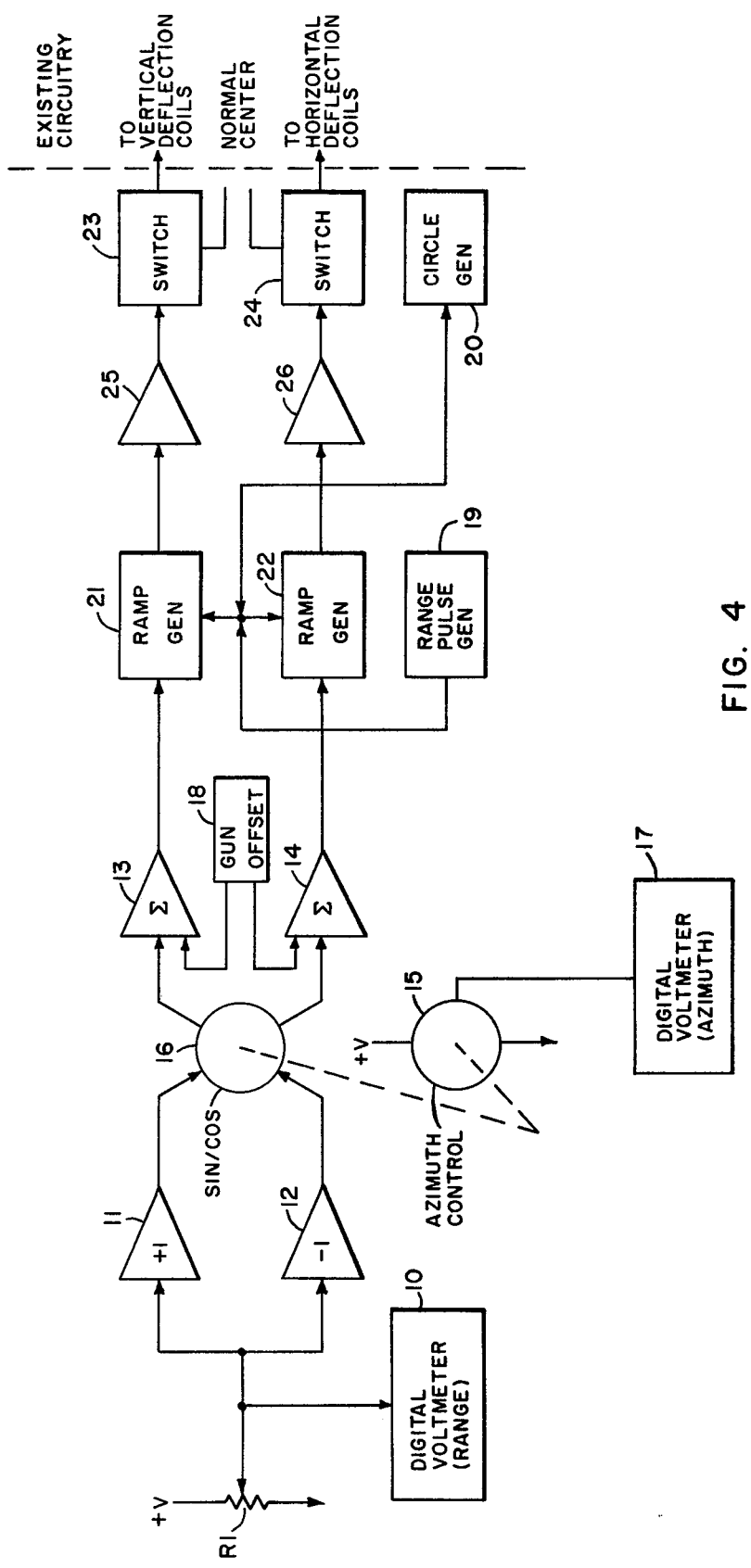
FIG. 4 is a schematic showing in block form of the basic embodiment.

FIG. 4 shows the over all system in block form. A variable resistor $R_1$ yields a voltage proportional to range of a target. This voltage is detected by a digital voltmeter 10 which indicates a direct reading of range in meters. This variable resistor is available as an operator control.

The voltage is then given a positive and negative sign by amplifiers 11 and 12 and fed to a sine/cosine potentiometer 16 to give an azimuth indication of a target. This potentiometer is available as an operator control with azimuth information in milliradians read by voltmeter 17 which is fed from potentiometer 15.

The "Gun Offset" 18 consists of centering controls H and V (FIG. 3) which allow an operator to preselect friendly artillery or other type counter action sites. Once these controls are set, the operator can relate range and bearing of targets to these sites at his discretion. Any number of controls could be used. The centering control each consists of two potentiometers, one for vertical deflection V and one for horizontal deflection H.

The two summers ($\Sigma$) 13 and 14 add the voltages from the offset centering controls 18 and the sin/cos potentiometer 16 to give a voltage which will result in an indication of the target on the PPI scope and on the digital readouts for range and azimuth relative to friendly sites once the operator has placed his identifying circle on the target. Ramp generators 21 and 22 provide synchronization.

Generator 19 generates a range pulse by developing a $0.67\mu$ sec long gate which is time modulated according to the scan rate to correspond with the desired pulse display width. This pulse rides on the cursor and is synchronized with the system trigger pulse.

The circle generator 20 provides the operator with a marker (a circle) to place over the target once a detection has been made. This will allow the operator to have a reference for the location of the target.

The switches 23 and 24 allow the operator to use the normal centering controls which are merely relative to the location of the radar. Amplifiers 25 and 26 amplify the vertical and horizontal to an appropriate level.

Data readout displays FIG. 3 provide range 10 in meters (four digits to 20,000 m) and bearing 17 in milliradians (four digits or dial display to 6400 mils). Data is referred to the operator's location and to two or more separate sites by the display offset capability.

Two purposes exist for the target identification marker 30 (FIGS. 1 and 2): (1) for marking a suspected enemy position and (2) for marking the location of friendly positions when adjusting the offset displays. Since a radar indicator uses rotating coils on the cathode ray tube (CRT), the marker is displayed once per antenna scan period, and is capable of being positioned anywhere on the face of the CRT from 0 to 20,000 meters in range. The marker's displayed dimensions can be variable but is typically one degree by 100 meters. An intensity modulation control is provided to the operator. An additional marker control is provided to the operator to permit simultaneous marker movement in the horizontal and vertical directions by using a joy stick or individual controls for horizontal and vertical movement.

A bearing strobe is provided by disabling the indicator sweep from the antenna drive system. The disabling switch is separate from the scanoff switch on the present console. Bearing readout is accurate to within 1 degree and is displayed on a dial or in digital form in milliradians. A knob control is provided to permit the operator to position the bearing strobe quickly and easily. A pulse is superimposed on the bearing strobe to permit the operator to determine range to within 100 meters accuracy. This range is displayed digitally. The indicator modifications can be packaged into a single unit which can be attached physically to an indicator.

A capability for providing range and bearing to counteraction sites is allowed. This capability is provided to the operator by the indicator modification. An operator, knowing range and bearing from his radar site to the counteraction sites, can position the center of the sweep of the PPI display over the counteraction site location. When a target appears, the operator can identify the target location, utilize his offset capability, and furnish range and bearing from the counteraction site to the target location. This offset capability is not necessarily restricted to a counteraction site. It can also be used for gunship vectoring or troop movement. Range and bearing is provided quickly and accurately by the radar operator.

In the operation the controller will first set the offset potentiometers by means of screws H and V on the control panel illustrated in FIG. 3. The settings will be a prearranged known value in accordance with the offset of the guns from the location of the radar's antenna. Next the switch 18 is activated to select which site the readout is to be relative to. Then the operator using the display adjusts resistor R1 and sine/cosine potentiometers 16 so as to locate the marker on the target in question. Once this is done the range in azimuth relative to the gun site selected can be read out on meters 10 and 17.

Figure 5:
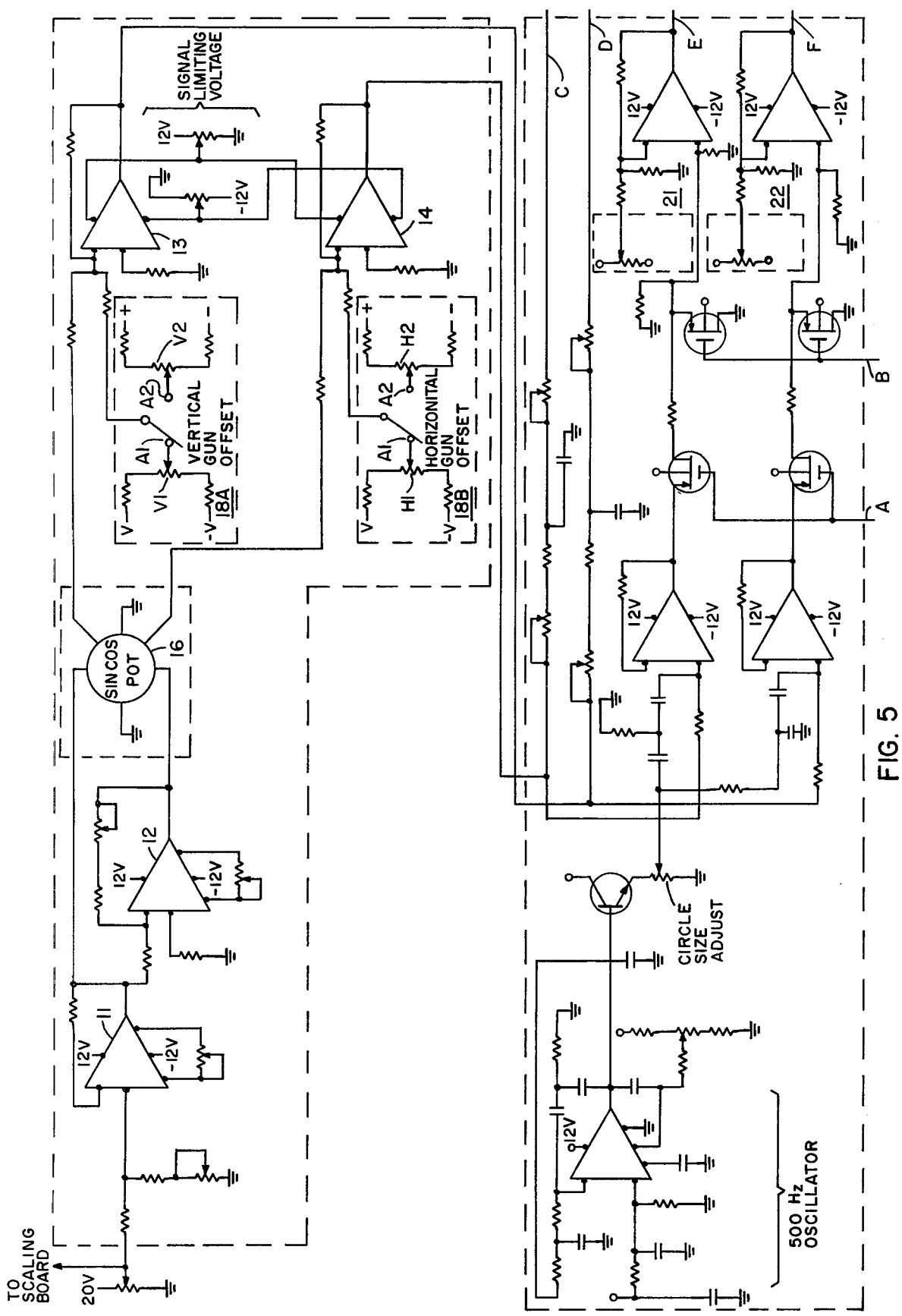
FIGS. 5-7 combine into a single circuit to show a detailed schematic diagram of the invention.
Figure 6:
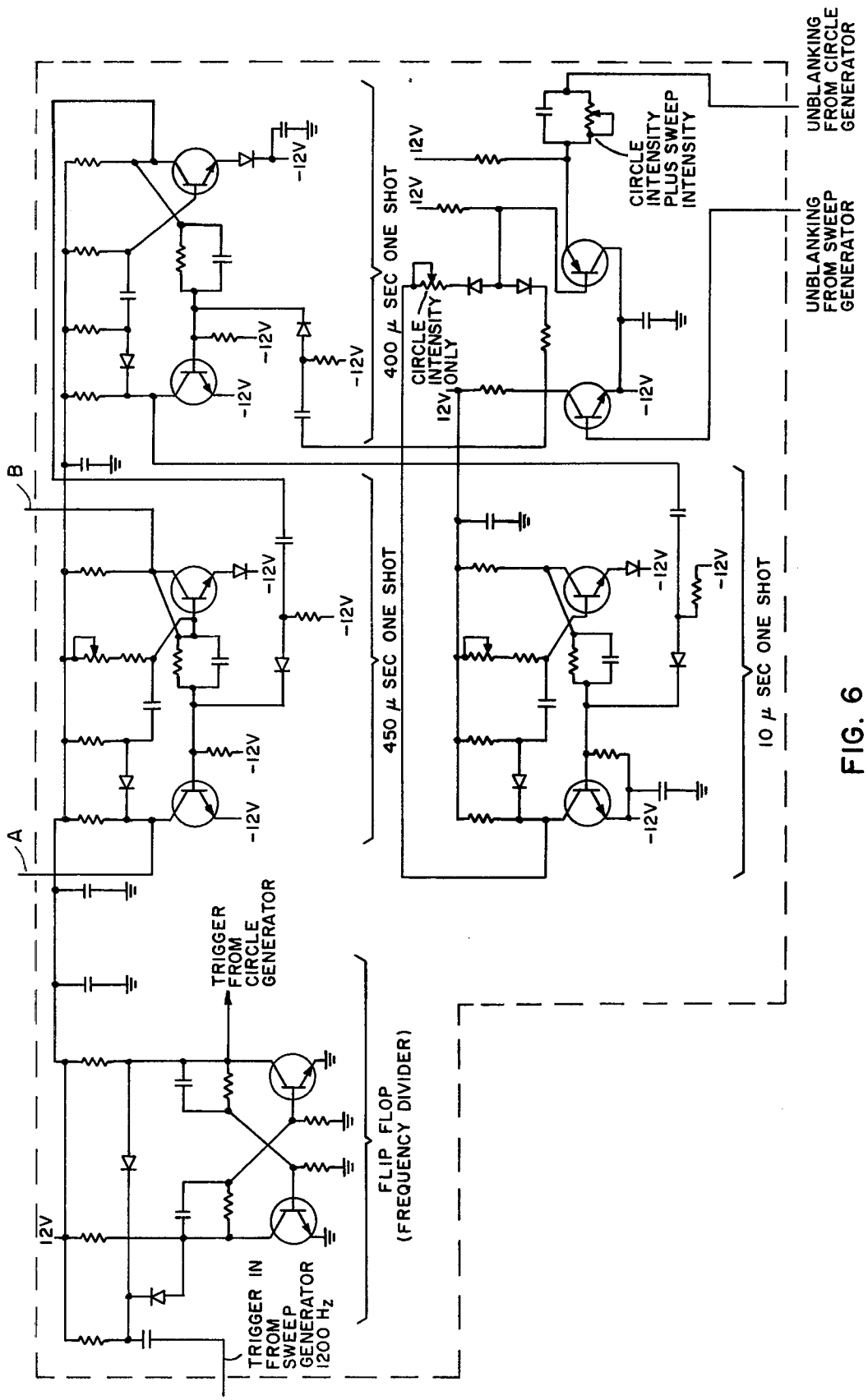
Figure 7:
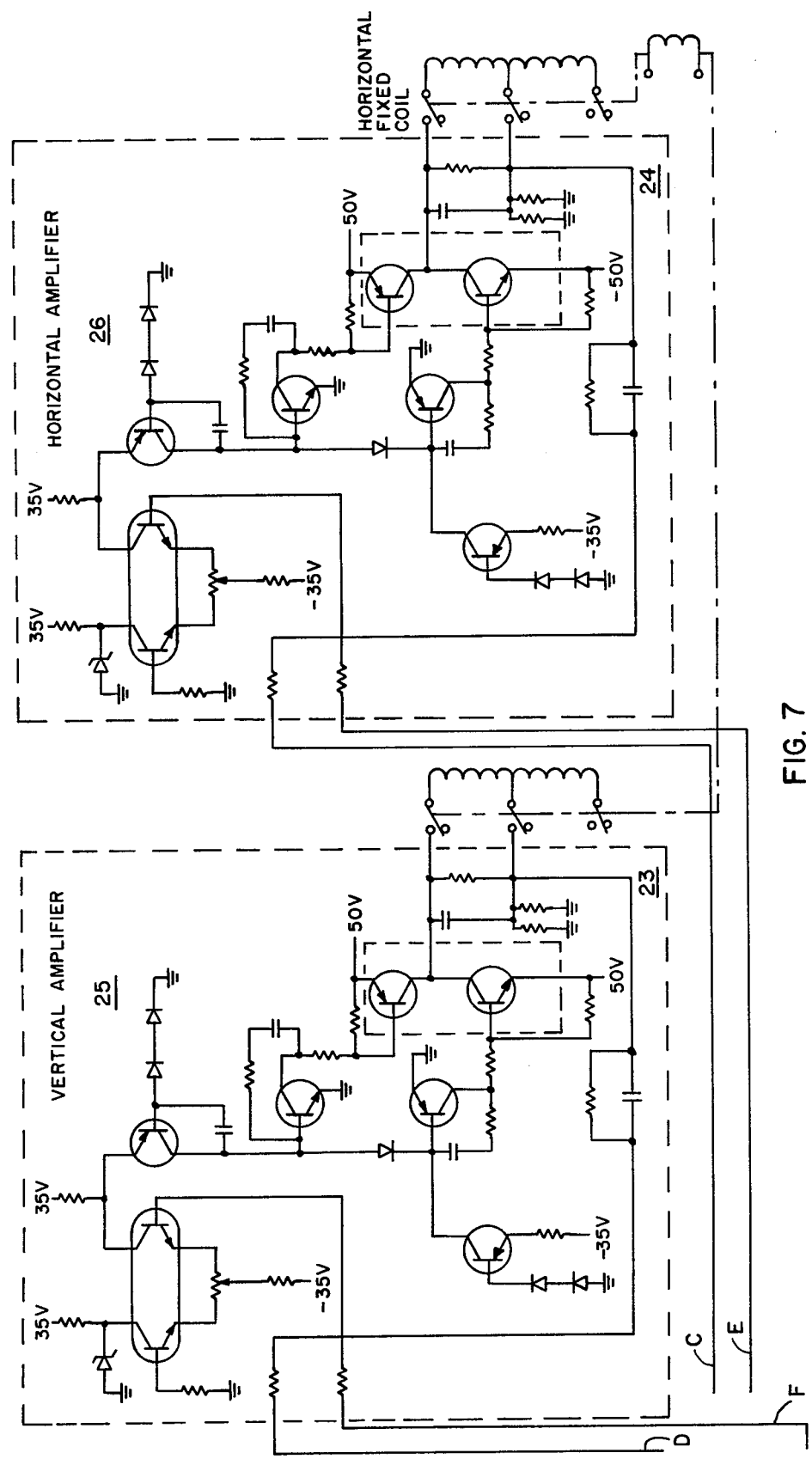

FIG. 5 is a drawing showing utilization of the invention. This drawing shows how the invention was implemented with the AN/TSQ-71A radar. This radar, incorporated with the invention, was tested and evaluated at Aberdeen Proving Ground in December 1970. The drawing provides significant detail in the inventions implementation with a particular radar. Circuitry would likely be modified for any other radar because of dissimilarities in a specific radar. This drawing is provided to show a successful implementation of the invention. The specific details of the operation of the circuit of FIG. 5 is not present, as such would only burden the disclosure with unnecessary details. Sufficient to say that FIG. 5 supports the showing of the blocks presented in FIG. 4.

We claim:

1. In a radar system having a display of target returns the improvement comprising the method of generating a marker on the display; utilizing a first control means to move said marker on the display in accordance with range; utilizing a second means to move said marker in accordance with azimuth; positioning the marker on a target return; associating readout means with said first control means so as to give the range of the marker and therefore the selected target return; associating readout means with said second control means so as to give the azimuth of said marker and therefore the azimuth of said selected target return; and providing an offset of the marker on the display in accordance with a site located remotely from the radar so as to give the readings in range and azimuth with respect to said site instead of said radar.

2. A method as set forth in claim 1 further comprising that the steps of providing plurality of offsets in accordance with a plurality of sites remotely located from said radar; selecting the desired offset in accordance with the desired site in order to have a range and azimuth reading therefrom.

3. A method as set forth in claim 2 further comprising the step of providing a bearing strobe in order to obtain bearing readout.

4. A method as set forth in claim 1 or 2 wherein the radar system uses a planned position indicator for its display.

* * * * *